(12) United States Patent
Han et al.

(10) Patent No.: US 12,047,849 B2
(45) Date of Patent: Jul. 23, 2024

(54) METHOD AND APPARATUS FOR GROUPCAST CONNECTION ESTABLISHMENT AND TRANSMISSION

(71) Applicant: LENOVO (BEIJING) LIMITED, Beijing (CN)

(72) Inventors: Jing Han, Beijing (CN); Haiming Wang, Beijing (CN); Lianhai Wu, Beijing (CN); Xiaodong Yu, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 593 days.

(21) Appl. No.: 17/278,238

(22) PCT Filed: Nov. 8, 2018

(86) PCT No.: PCT/CN2018/114630
§ 371 (c)(1),
(2) Date: Mar. 19, 2021

(87) PCT Pub. No.: WO2020/093328
PCT Pub. Date: May 14, 2020

(65) Prior Publication Data
US 2021/0352445 A1 Nov. 11, 2021

(51) Int. Cl.
*H04W 28/02* (2009.01)
*H04W 4/08* (2009.01)
(Continued)

(52) U.S. Cl.
CPC .............. *H04W 4/08* (2013.01); *H04W 4/40* (2018.02); *H04W 12/55* (2021.01); *H04W 72/20* (2023.01);
(Continued)

(58) Field of Classification Search
CPC ......... H04W 4/08; H04W 4/40; H04W 12/55; H04W 72/20; H04W 76/10; H04W 28/0268; H04W 4/80
See application file for complete search history.

(56) References Cited

U.S. PATENT DOCUMENTS

2017/0318622 A1* 11/2017 Yi ........................ H04L 61/5069
2018/0124846 A1* 5/2018 Jung ...................... H04W 48/14
2019/0349719 A1* 11/2019 Pattan ..................... H04W 4/08

FOREIGN PATENT DOCUMENTS

CN 106993259 A 7/2017
CN 107027104 A 8/2017
(Continued)

OTHER PUBLICATIONS

3GPP, 3rd Generation Partnership Project; Technical Specification Group Radio Access Network; Discovery Procedure and Connection Setup Procedure in NR Sidelink, 3GPP R2-1813731, Oct. 2018, pp. 1-4.
(Continued)

Primary Examiner — Joseph E Dean, Jr.
(74) Attorney, Agent, or Firm — Kunzler Bean & Adamson

(57) ABSTRACT

The present disclosure relates to methods and apparatuses for groupcast connection establishment and transmission. According to an embodiment of the present disclosure, a method can include: transmitting, from a first user equipment, first information for a groupcast connection establishment; receiving, at the first user equipment, second information for the groupcast connection establishment from a second user equipment, wherein the second information comprises identity information of the second user equipment; and transmitting, from the first user equipment, third information for the groupcast connection establishment to the second user equipment, wherein the third information
(Continued)

indicates whether the groupcast connection establishment is successful. Embodiments of the present disclosure propose a novel groupcast connection establishment procedure, which can meet the advanced V2X service requirements.

20 Claims, 11 Drawing Sheets

(51) Int. Cl.
    *H04W 4/40*        (2018.01)
    *H04W 12/55*      (2021.01)
    *H04W 72/20*      (2023.01)
    *H04W 76/10*      (2018.01)

(52) U.S. Cl.
    CPC ........ *H04W 76/10* (2018.02); *H04W 28/0268* (2013.01)

(56) References Cited

FOREIGN PATENT DOCUMENTS

| WO | 2017076055 A1 | 5/2017 |
| WO | WO-2017076055 A1 * | 5/2017 |

OTHER PUBLICATIONS

International Searching Authority, "Notification of Transmittal of the International Search Report and the Written Opinion of the International Searching Authority, or the Declaration", PCT/CN2018/114630, Nov. 8, 2018, pp. 1-6.

\* cited by examiner

METHOD AND APPARATUS FOR GROUPCAST CONNECTION ESTABLISHMENT AND TRANSMISSION

TECHNICAL FIELD

The present disclosure is related to wireless communication technology, and more particularly, related to groupcast connection establishment and transmission between UEs (user equipment).

BACKGROUND

To expand the 3GPP (3rd Generation Partnership Project) platform to the automotive industry, the initial standard on support of V2V (vehicle to vehicle) services was completed in September 2016. Enhancements focusing on additional V2X (vehicle to everything) operation scenarios leveraging the cellular infrastructure, are completed in March 2017 as 3GPP V2X phase 1 for inclusion in Rel-14 LTE (Long Term Evolution).

3GPP V2X phase 2 in Rel-15 LTE introduces a number of new features in sidelink, including: carrier aggregation, high order modulation, latency reduction, and feasibility study on both transmission diversity and short TTI (Transmission Time Interval) on sidelink.

3GPP V2X phase 3 in NR (New radio) identifies 25 use cases for advanced V2X services, which are categorized into four use case groups: vehicles platooning, extended sensors, advanced driving and remote driving. Detailed description of each use case group is provided as below.

Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. Vehicles can increase the perception of their environment beyond of what their own sensors can detect and have a more broad and holistic view of the local situation. High data rate is one of its key characteristics.

Advanced Driving enables semi-automated or full-automated driving. Each vehicle shares its own perception data obtained from its local sensors with vehicles in proximity. That allows vehicles to synchronize and coordinate their trajectories or manoeuvres. Each vehicle shares its driving intention with vehicles in proximity.

Remote Driving enables a remote driver or a V2X application to operate a remote vehicle for those passengers which cannot drive by themselves or remote vehicles located in dangerous environments. For a case that variation is limited and routes are predictable, such as public transportation, driving based on cloud computing can be used. High reliability and low latency are the main requirements of the Remote Driving.

Since the advanced V2X services have more variable and strict QoS (Quality of Service) requirements than the services requirements in Rel-14 and Rel-15 LTE V2X, it is important to study Layer-2/Layer-3 protocols and procedures to support unicast and groupcast design on sidelink, especially the sidelink handling for unicast and groupcast. Accordingly, the industry desires improved groupcast connection establishment and transmission procedures to implement more advanced QoS mechanisms to meet the advanced V2X service requirements.

SUMMARY OF THE DISCLOSURE

One object of the present disclosure is to provide a technical solution for groupcast connection establishment and transmission between V2X UEs, which can meet the strict QoS requirement in the advanced V2X services.

According to an embodiment of the present disclosure, a method includes: transmitting, from a first user equipment, first information for a groupcast connection establishment; receiving, at the first user equipment, second information for the groupcast connection establishment from a second user equipment, wherein the second information includes identity information of the second user equipment; and transmitting, from the first user equipment, third information for the groupcast connection establishment to the second user equipment, wherein the third information indicates whether the groupcast connection establishment is successful.

In an embodiment of the present disclosure, the first information includes at least one of: group identity information, identity information of the first user equipment, at least one transmission pool for groupcast transmission, at least one frequency for groupcast transmission, bandwidth capability of the first user equipment, QoS configuration information, and radio layer related configuration information.

In another embodiment of the present disclosure, the second information further includes at least one of: at least one transmission pool for groupcast transmission, at least one frequency for groupcast transmission, and bandwidth capability of the second user equipment.

In yet another embodiment of the present disclosure, the method further includes: receiving, at the first user equipment, fourth information indicating a new identity of the second user equipment changed during groupcast transmission.

According to another embodiment of the present disclosure, a method includes: receiving, at a second user equipment, first information for a groupcast connection establishment from a first user equipment; transmitting, from the second user equipment, second information for the groupcast connection establishment, wherein the second information includes identity information of the second user equipment; receiving, at the second user equipment, third information for the groupcast connection establishment from the first user equipment, wherein the third information indicates whether the groupcast connection establishment is successful.

In an embodiment of the present disclosure, the method further includes: transmitting, from the second user equipment, fourth information indicating a new identity of the second user equipment changed during groupcast transmission.

An embodiment of the present disclosure also provide an apparatus, including: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

Embodiments of the present disclosure provide a technical solution for AS layer groupcast connection establishment and transmission for NR V2X groupcast transmission. Accordingly, embodiments of the present disclosure will facilitate the application of the NR V2X groupcast transmission.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered limiting of its scope.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Figure 1:
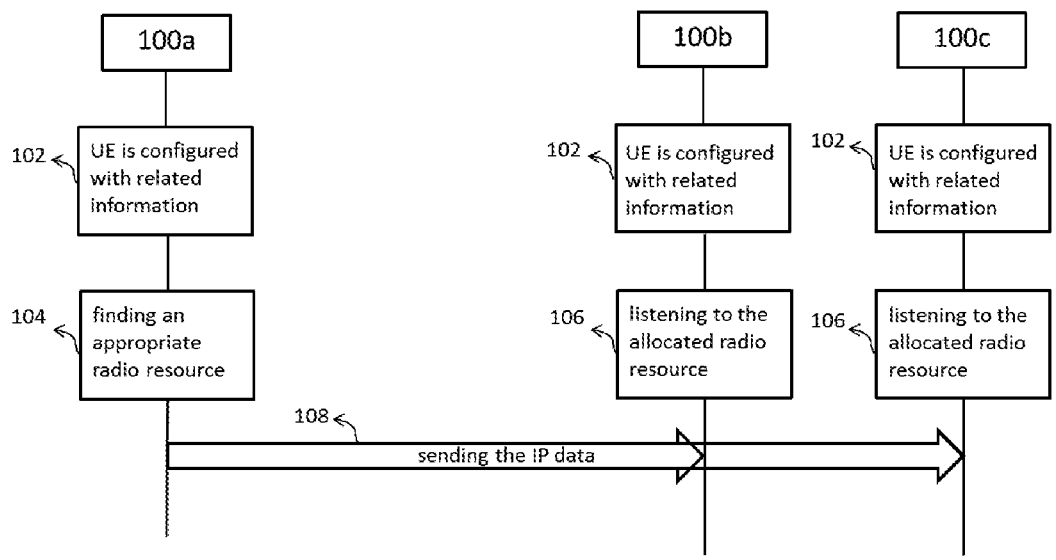
FIG. 1 is a flow chart illustrating a method for one-to-multiple transmission in D2D scenario according to an embodiment of the present disclosure.

FIG. 1 is a flow chart illustrating a method for one-to-multiple communication transmission in D2D scenario according to an embodiment of the present disclosure.

As shown in FIG. 1, in step 102, a plurality of UEs 100, for example UE-1 100a, UE-2 100b, and UE-3 100c can be configured with related information for one-to-multiple ProSe (Proximity-based Services) Direct Communication, for example group information. In an embodiment of the present disclosure, each of UE-1 100a, UE-2 100b and UE-3 100c may be a V2X UE, for example a V2X vehicle, and they can be configured to be within the same group. UE-1 100a, UE-2 100b, and UE-3 100c can obtain necessary group context for the Direct Communication. The group context may include ProSe Layer-2 Group ID (Identity) and ProSe Group IP multicast address.

In step 104, the source UE, for example UE-1 100a may find an appropriate radio resource to conduct one-to-multiple ProSe Direct Communication.

Accordingly, in step 106, the destination UEs, for example UE-2 100b and UE-3 100c may listen to the allocated radio resource to receive the one-to-multiple ProSe Direct Communication. Wherein, the protocol data unit passed for transmission to the AS (Access Stratum) among the plurality UEs 100 is associated with: Layer-3 protocol data unit type, corresponding Source Layer-2 ID and Destination Layer-2 ID, and ProSe Per-Packet Priority associated with the protocol data unit. The Layer-3 protocol data types supported for one-to-multiple ProSe Direct Communication may be IP and Address Resolution Protocol. The Destination Layer-2 ID, for example the layer-2 ID of UE-2 100b can be set to the ProSe Layer-2 Group ID. The Source Layer-2 ID, for example the layer-2 ID of the source UE-1 100a can be derived from ProSe UE ID, which is either assigned by ProSe 3Key Management Function, or assigned by the source UE itself. For example, according to an embodiment of the present disclosure, when bearer-level security is configured to be used, the ProSe UE ID of a UE, for example UE-1 100a, UE-2 100b, or UE-3 100c can be assigned by the ProSe 3Key Management Function as defined in TS 33.303. The ProSe 3Key Management Function can ensure that the ProSe UE ID of each UE, for example UE-1 100a, UE-2 100b, or UE-3 100c is unique in the context of one-to-multiple ProSe Direct Communication for this group.

According to another embodiment of the present disclosure, when bearer-level security is configured not to be used, the ProSe UE ID of a UE, for example UE-1 100a, UE-2 100b, or UE-3 100c is either configured in the UE or self-assigned by the UE.

In step 108, the source UE, for example UE-1 100a may send the IP data to the destination IP multicast address using the ProSe Layer-2 Group ID.

During the above one-to-multiple communication transmission in the D2D scenario, the group is already configured by the upper layer higher than the AS layer, the D2D UEs just transmit the group packets within the group. That is, the one-to-multiple communication transmission is D2D connection-lack in AS layer. The connection-lack transmission has to pay more processing efforts, e.g. performing Layer-1/Layer-2 processing on a packet and then determining whether the packet is for UE itself. Accordingly, spectrum efficiency will be low due to e.g. using more conservative MCS (Modulation and Coding Scheme) and retransmission numbers. Besides, more protocol overhead can be introduced since each packet needs to carry source and destination layer-2 ID. Thus, the connection-lack transmission is enabled for ProSe-enabled Public Safety UEs only having LTE voice and data transmission, which does not need high QoS requirement.

Unlike the one-to-multiple communication transmission in D2D scenario, the V2X advanced service has more stringent QoS requirement, e.g. the delay is [3, 100] ms for V2V, the reliability is [90%, 99.999%], and the data rate can reach up to 1 Gbps. Such stringent QoS requirement of the advanced V2X service can hardly be met by the above connection-lack transmission in D2D scenario. Therefore, groupcast connections in AS layer are necessary for NR V2X UEs, such that the AS layer can exchange radio layer related configurations or parameters to enable more efficient groupcast transmission for NR V2X.

Figure 2A:
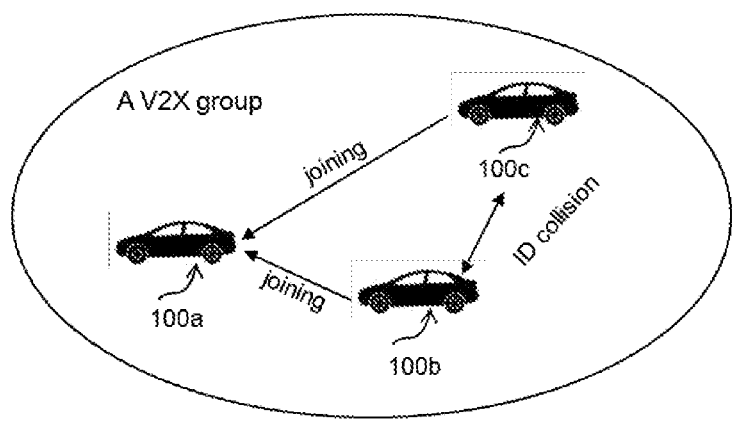
FIG. 2A is a schematic view of a groupcast connection establishment scenario according to an embodiment of the present disclosure.
Figure 2B:
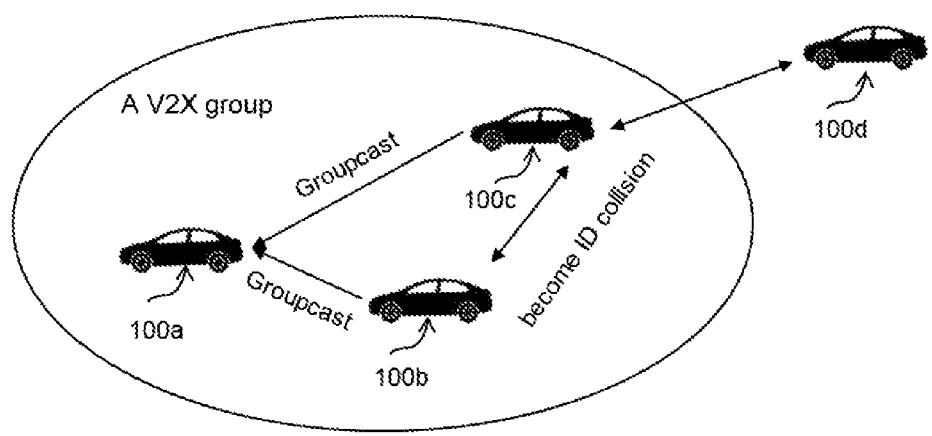
FIG. 2B is a schematic view of a groupcast transmission scenario according to another embodiment of the present disclosure.

In addition, during the groupcast connection establishment procedure and groupcast transmission between V2X UEs, a sidelink ID collision problem may exist as illustrated in FIGS. 2A and 2B, which will be explained in the following context.

Specifically, FIG. 2A is a schematic view of a groupcast connection establishment scenario according to an embodiment of the present disclosure.

As shown in FIG. 2A, UE-1 100a is the group leader of a V2X group, which may initiate the groupcast connection for groupcast transmission. UE-2 100b and UE-3 100c may try to join the group (hereinafter "potential group member") by responding to the groupcast connection initiated by UE-1 100a. Although only UE-1 100a, UE-2 100b and UE-3 100c within one group are shown for illustrating the embodiment of the present disclosure in a simplified manner, persons skilled in the art should understand there can be more UEs and more groups. Each of UE-1 100a, UE-2 100b and UE-3 100c may be a V2X UE, for example a vehicle. During establishing the group connection, potential group member UEs, for example, UE-2 100b and UE-3 100c only indicate their sidelink IDs to the group leader UE-1 100a respectively, and have no idea with other potential group member's ID. Accordingly, the sidelink IDs of the potential group members, for example UE-2 100b and UE-3 100c may be the same, and thus an identity collision issue happens.

Identity collision issues can also happen during a groupcast transmission as shown in FIG. 2B. FIG. 2B is a schematic view of a groupcast transmission scenario according to an embodiment of the present disclosure. The groupcast transmission scenario can happen after the groupcast connection shown in FIG. 2A is successfully established.

As shown in FIG. 2B, UE-1 100a is the group leader of a V2X group, which initiates the groupcast connection for groupcast transmission. UE-2 100b and UE-3 100c are group members after joining the group initiated by UE-1 100a. Each of UE-1 100a, UE-2 100b and UE-3 100c may be a V2X UE, for example a vehicle. During the group transmission, a group member, for example, UE-3 100c may change its sidelink ID. The reason may be the sidelink ID of UE-3 100c collides with the sidelink ID of another V2X UE outside the group, for example UE-4 100d. Since group members UE-2 100b and UE-3 100c have no idea with other members' sidelink IDs, the updated sidelink ID of UE-3 100c may collide with the sidelink ID of UE-2 100b. Accordingly, an identity collision issue happens to UE-2 100b and UE-3 100c.

Therefore, it is necessary to design a novel groupcast connection establishment procedure in the AS layer and solve the ID collision during the groupcast connection establishment procedure and groupcast transmission, so that the link adaptation and QoS mechanisms can be implemented in AS layer to meet the advanced V2X service requirements.

Embodiments of the present disclosure propose a novel groupcast connection establishment procedure and apparatus, which can meet the advanced V2X service requirements.

More details on the embodiments of the present disclosure will be illustrated in the following text in combination with the appended drawings.

Figure 3A:
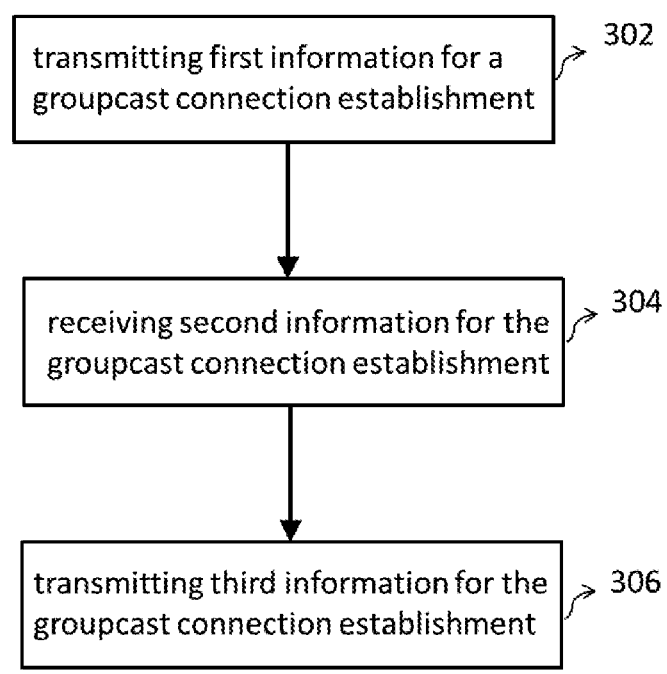
FIG. 3A is a flow chart illustrating a method for groupcast connection establishment between UEs according to an embodiment of the present disclosure.

FIG. 3A is a flow chart illustrating a method for groupcast connection establishment between UEs according to an embodiment of the present disclosure. The method may be performed by a group leader UE (hereinafter "a first UE" for clarity), which initiates the groupcast connection establishment, for example, a UE-1 100a. The first UE or the group leader UE may be a V2X UE, such as a vehicle.

As shown in FIG. 3A, in step 302, the first UE, for example UE-1 100a may transmit first information for a groupcast connection establishment in a broadcast manner or groupcast manner. The first information for the groupcast connection establishment may be a RRC (Radio Resource Control) message, such as a groupcast connection establishment request message. This step 302 may be triggered by a higher layer than the AS layer. When the first information for the groupcast connection is transmitted in a broadcast manner, all the neighbor UEs of the first UE, for example UE-2 100b and UE-3 100c may receive the first information. When the first information for the groupcast connection is transmitted in a groupcast manner, the UEs, for example UE-2 100b and UE-3 100c belonging to the same groupcast transmission group as the first UE may receive the first information. In this case, whether a UE belong to the group is configured by the higher layer than the AS layer.

The first information may include at least one of: group identity information, identity information of the first UE, at least one transmission pool for groupcast transmission, at least one frequency for groupcast transmission, bandwidth capability of the first UE, QoS configuration information, and radio layer related configuration information.

The group identity information may include the ID of the group. The group ID may be configured by the higher layer than the AS layer and can be used as a destination ID for the groupcast transmission. Group ID may be derived from a ProSe UE ID, or a group layer-2 ID.

The identity information of the first UE may be represented in one of: ProSe UE identity, source layer-2 identity, destination layer-2 identity, session identity, and connection identity. Each of the source layer-2 identity and destination layer-2 identity of the first UE can be derived from ProSe UE ID, which is either assigned by ProSe 3Key Management Function, or assigned by the first UE itself as stated above.

The at least one transmission pool for groupcast transmission may be configured by a base station (for example, a gNB). In another embodiment of the present disclosure, the at least one transmission pool for groupcast transmission may be pre-configured in SIM (Subscriber Identity Module), USIM (Universal Subscriber Identity Module), or in the first UE. For example, when the first UE is in the coverage of the base station, the first UE may use the transmission pools configured by the base station. When the first UE is out of coverage of the base station, the first UE may use the transmission pools pre-configured in in SIM, USIM, or in the UEs. In this case, different UEs within the group for groupcast transmission may use different transmission pools if the transmission pool configuration is not exchanged in AS layer. The reason is that some UEs of the group may be in the coverage of the base station, while some UEs may be out of the coverage of the base station.

The at least one frequency for groupcast transmission of the first UE includes at least one frequency on which the first UE can do the transmission and reception. This information of the at least one frequency is helpful to coordinate the frequency-time resource for groupcast transmission among the UEs within the group.

The bandwidth capability of the first UE includes the bandwidth in which the first UE can do the transmission and reception. The information bandwidth capability is helpful to coordinate the frequency-time resource for groupcast transmission among the UEs within the group.

The QoS configuration information may be as defined in TS 23.501, for example including at least one of: 5QI indication, delay requirement indication, reliability requirement indication, radio bear configuration, and QoS flow to radio bearer mapping indication. According to an embodiment of the present application, there are multiple QoS flows for the groupcast services. Thus the QoS configuration information may include QoS configuration information for each QoS flow.

The radio layer related configuration information may include at least one of: MAC (media access control) configuration information, RLC (radio link control) configuration information, PDCP (packet data convergence protocol) configuration information, and physical layer configuration information. The MAC configuration information may include configuration information for the number of HARQ (hybrid automatic repeat request) retransmission, which indicates the maximum retransmission time, for example, one or more times for the retransmission. The RLC configuration information may include configuration information for RLC AM (acknowledged mode) or UM (unacknowledged mode). The PDCP configuration information may include configuration information for PDCP duplication. The physical layer configuration information may include at least one of HARQ configuration information and CSI (channel state information) configuration information.

The first UE may receive information in response to the first information from UEs interested in the groupcast connection (response UE) initiated by the first UE. The information in response to the first information can indicate related information of the response UE, such as the ID of the response UE, so that the first UE can use it to establish the groupcast connection. For example, in step 304, the first UE may receive second information for the groupcast connection establishment from a response UE, for example, a second UE like UE-2 100b. Although only the second UE is used to illustrate the embodiments of the present disclosure, persons skilled in the art should understand that there may be a plurality of UEs interested in the groupcast connection, which may be a third UE, a fourth UE. The procedure illustrated with the second UE is applicable to all of the response UE. In addition, "the first," "the second," and "the third" . . . are only used to clearly illustrate the embodiments of the present disclosure, but not be used to limit the substance of the present disclosure.

Similar to the group leader UE or first UE, the response UE may be a V2X UE such as a vehicle. The second information for the groupcast connection establishment may be a RRC message, such as a groupcast connection establishment response message. The second information may include identity information of the response UE.

For example, the identity information of the response UE, for example the second UE may be represented in one of: ProSe UE identity, source layer-2 identity, destination layer-2 identity, session identity, and connection identity. Each of the source layer-2 identity and destination layer-2 identity of the second UE can be derived from ProSe UE ID, which can be either assigned by ProSe 3Key Management Function, or assigned by the second UE itself as stated above.

According to an embodiment of the present application, the second information may further include at least one transmission pool for groupcast transmission, at least one frequency for groupcast transmission, and bandwidth capability of the second UE.

The at least one transmission pool for groupcast transmission may be selected by the second UE based on the at least one transmission pool included in the first information. For example, the second UE may select the at least one transmission pool from its available transmission pools, which overlaps the at least one transmission pool included in the first information. The available transmission pools for the second UE may be configured by a base station, for example, a gNB. In another embodiment of the present disclosure, the available transmission pools for the second UE may be pre-configured in SIM, USIM, or in the second UE. For example, when the second UE is in the coverage of the base station, the available transmission pools of the second UE may be configured by the base station. When the second UE is out of coverage of the base station, the available transmission pools of the second UE may be pre-configured in SIM, USIM, or in the UEs.

The at least one frequency for groupcast transmission of the second UE includes at least one frequency on which the second UE can do the transmission and reception. The information of the at least one frequency is helpful to coordinate the frequency-time resource for groupcast transmission among the UEs within the group.

The bandwidth capability of the second UE includes the bandwidth in which the second UE can do the transmission and reception. The information of bandwidth capability is helpful to coordinate the frequency-time resource for groupcast transmission among the UEs within the group.

In response to the second information form the second UE, the first UE may make a response. According to an embodiment of the present disclosure, in step 306, the first UE may transmit third information for the groupcast connection establishment to the second UE, wherein the third information indicates whether the groupcast connection establishment is successful.

According to an embodiment of the present disclosure, after receiving the second information from the second UE, the first UE may determine whether an identity collision happened to the second UE. For example, the first UE may determine whether the identity of the second UE is the same as the identities of other UEs, for example UE-3 100c, which also transmits information similar to the second information in response to the first information. In the case that the identity of the second UE is the same as the identity of at least one of other UEs, then the identity collision may happen to the second UE. In the case that the identity of the second UE is different from the identity of the other UEs, then no identity collision happens to the second UE.

In an embodiment of the present disclosure, in the case that there is no identity collision happened to the second UE, the third information may indicate that the groupcast connection establishment is successful. For example, the third information may be a groupcast connection establishment confirmation message.

In another embodiment of the present disclosure, in the case that there is an identity collision happened to the second UE, the third information may also indicate that the groupcast connection establishment is successful, while indicate the identity collision issue to other UE(s) whose identity is the same as the identity of the second UE. The third information may be a groupcast connection establishment confirmation message.

In yet another embodiment of the present disclosure, in the case that there is an identity collision happened to the second UE, the third information may indicate that the groupcast connection establishment is not successful. For example, the third information may be a groupcast connection establishment rejection message.

According to an embodiment of the present disclosure, in the case that the third information indicating an unsuccessful groupcast connection establishment, the first UE may subsequently receive fourth information indicating a new identity of the second UE different from the previous one. The first UE can perform similar processing as performed after receiving the second information. For example, the first UE may check whether an identity issue happens to the new identity of the second UE, and transmit information indicating whether the groupcast connection establishment is successful to the second UE. This procedure can start all over again until the establishment is successful. According to another embodiment of the present disclosure, the second UE may directly give up the establishment after receiving the third information indicating the establishment is unsuccessful. According to yet another embodiment of the present disclosure, the second UE may change its identity, and try the establishment several times after receiving the third information indicating the establishment. In the case that all the tries failed, the second UE may give up the establishment.

In yet another embodiment of the present disclosure, in the case that there is an identity collision happened to the second UE, the first UE may change the identity of the second UE into a new one. Third information may indicate the new identity of the second UE. For example, the third information may be a groupcast connection establishment confirmation message with the new identity of the second UE assigned by the first UE. In this case, the third information indicates that the groupcast connection establishment is successful with the assigned new identity, and the second UE should update its sidelink ID based on the assigned new identity.

Figure 3B:
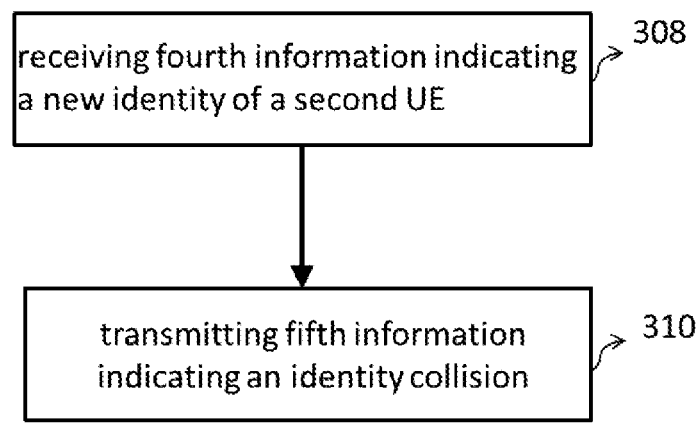
FIG. 3B is a flow chart illustrating a method for solving ID collision during groupcast transmission according to an embodiment of the present disclosure.

FIG. 3B is a flow chart illustrating a method for solving ID collision during groupcast transmission according to an embodiment of the present disclosure, which may be performed by a group leader UE, which initiates the groupcast connection establishment, for example, a first UE like UE-1 100a. The first UE or the group leader UE may be a V2X UE, such as a vehicle. The method illustrated in FIG. 3B may occur after the groupcast connection establishment illustrated in FIG. 3A.

As shown in FIG. 3B, in step 308, the first UE may receive fourth information indicating an identity of a second UE changed during groupcast transmission. The identity of the second UE changed during groupcast transmission is a new identity compared with the identity indicated in the second information. The second UE is a group member UE which has joined to the group through the groupcast connection establishment procedure as shown in FIG. 3A, for example, a UE-2 100b. Similar to the group leader UE or first UE, the group member UE may be a V2X UE, such as a vehicle.

After receiving the fourth information from the second UE, the first UE may determine whether an identity collision happened to the second UE. For example, the first UE may determine whether the identity of the second UE is the same as the identities of other group member UEs, which have joined the group through the groupcast connection establishment procedure. In the case that the identity of the second UE is the same as the identity of at least one of other group member UEs, the first UE may determine that an identity collision may happen to the second UE. In the case that the identity of the second UE is different from the identity of other group member UEs, the first UE may determine that no identity collision happens to the second UE. The identities of other group member UEs may be received during the groupcast connection establishment procedure or may be received during the groupcast transmission.

In step 310, the first UE may transmit fifth information indicating that there is an identity collision happened to the second UE in response to the fourth information in the case that there is an identity collision happened to the second UE.

In an embodiment of the present disclosure, after transmitting the fifth information, the first UE may subsequently receive six information indicating a new identity of the second UE different from the identity in the fourth information, and then the first UE may transmit a seventh information responding the new identity in the six information. However, the seventh information confirming the new identity in the six information is not necessary, the first UE may not transmit the seventh information for confirming or rejecting the new identity in the six information.

In yet another embodiment of the present disclosure, the fifth information may indicate a new identity of the second UE assigned by the first UE different from the identity in the fourth information. In this case, the fifth information indicates that the second UE should update its sidelink ID based on the assigned new identity.

However, the fifth information is not necessary. In the case that there is no identity collision happened to the second UE, the first UE may transmit an indication confirming the change of the identity of the second UE in the fourth information. In another embodiment, the first UE may not transmit any indication in the case that there is no identity collision happened to the second UE.

Figure 4A:
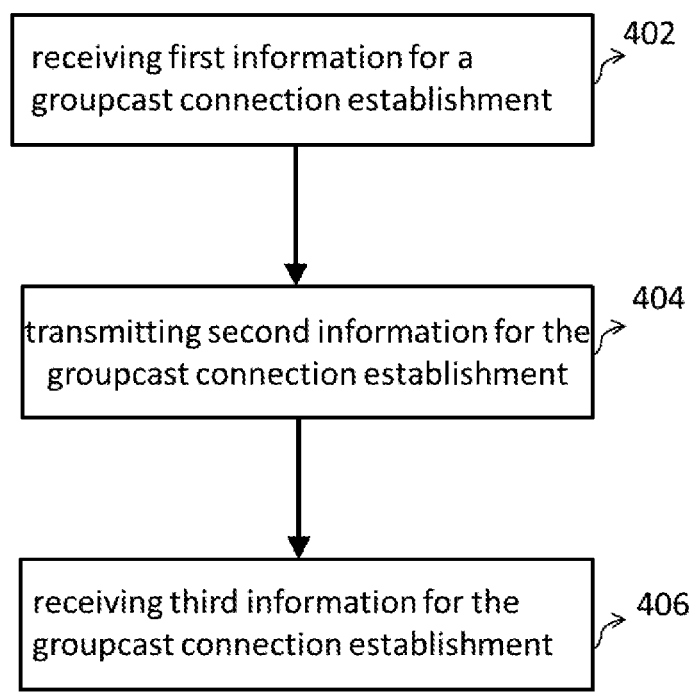
FIG. 4A is a flow chart illustrating a method for groupcast connection establishment between UEs according to another embodiment of the present disclosure.

FIG. 4A is a flow chart illustrating a method for groupcast connection establishment between UEs according to another embodiment of the present disclosure. The method may be performed by a potential group member UE (hereinafter "a response UE" for clarity), which is interested in the groupcast connection establishment proposed by a first UE or a group leader UE, for example, a second UE like UE-2 100b. The response UE may be a V2X UE, such as a vehicle. The first UE or the group leader UE is a UE which initiates the groupcast connection establishment, for example, a UE-1 100a. Similar to the response UE, the group leader UE may be may be a V2X UE, such as a vehicle.

As shown in FIG. 4A, in step 402, the second UE may receive first information for a groupcast connection establishment from the first UE. The second UE may check the first information and determine whether the second UE is interested in establishing a groupcast connection based on the group ID indicated in the first information. The first information for the groupcast connection establishment may be a groupcast connection establishment request message, which is a RRC message.

The first information may include at least one of: group identity information, identity information of the first UE, at least one transmission pool for groupcast transmission, at least one frequency for groupcast transmission, bandwidth capability of the first UE, QoS configuration information, and radio layer related configuration information.

The group identity information may include the ID of the group. The group ID may be configured by the higher layer than the AS layer and can be used as a destination ID for the groupcast transmission. Group ID may be derived from a ProSe UE ID, or a group layer-2 ID.

The identity information of the first UE may be represented in one of: ProSe UE identity, source layer-2 identity, destination layer-2 identity, session identity, and connection identity. Each of the source layer-2 identity and destination layer-2 identity of the first UE can be derived from a ProSe UE ID, which is either assigned by ProSe 3Key Management Function, or assigned by the first UE itself as stated above.

The at least one transmission pool for groupcast transmission may be configured by a base station, for example, a gNB). In another embodiment of the present disclosure, the at least one transmission pool for groupcast transmission may be pre-configured in SIM, USIM, or in the first UE. For example, when the first UE is in the coverage of the base station, the first UE may use the transmission pools configured by the base station. When the first UE is out of coverage of the base station, the first UE may use the transmission pools pre-configured in SIM, USIM, or in the UEs. In this case, different UEs within the same group for groupcast transmission may use different transmission pools if the transmission pool configuration is not exchanged in AS layer. The reason is that some UEs of the group may be in the coverage of the base station, while some UEs may be out of the coverage of the base station.

The at least one frequency for groupcast transmission of the first UE includes at least one frequency on which the first UE can do the transmission and reception. The information of the at least one frequency is helpful to coordinate the frequency-time resource for groupcast transmission among the UEs within the group.

The bandwidth capability of the first UE includes the bandwidth in which the first UE can do the transmission and reception. The information of the bandwidth capability of the first UE is helpful to coordinate the frequency-time resource for groupcast transmission among the UEs within the group.

The QoS configuration information may as defined in TS 23.501, for example including at least one of: 5QI indication, delay requirement indication, reliability requirement indication, radio bear configuration, and QoS flow to radio bearer mapping indication. According to an embodiment of the present application, there are multiple QoS flows for the groupcast services. Thus the QoS configuration information may include QoS configuration information for each QoS flow.

The radio layer related configuration information may include at least one of: MAC configuration information, RLC configuration information, PDCP configuration information, and physical layer configuration information. The MAC configuration information may include configuration information for the number of HARQ retransmission, which indicates the maximum retransmission time, for example, one or more times for the retransmission. The RLC configuration information may include configuration information for RLC AM or UM. The PDCP configuration information may include configuration information for PDCP duplication. The physical layer configuration information may include at least one of HARQ configuration information and CSI configuration information.

In step 404, the second UE may transmit second information for the groupcast connection establishment to the first UE. The second information for the groupcast connection establishment may be a groupcast connection establishment response message, which is a RRC message. The second information may include identity information of the second UE.

For example, the identity information of the second UE may be represented in one of: ProSe UE identity, source layer-2 identity, destination layer-2 identity, session identity, and connection identity. Each of the source layer-2 identity and destination layer-2 identity of the second UE can be derived from ProSe UE ID, which can be either assigned by ProSe 3Key Management Function, or assigned by the second UE itself as stated above.

According to an embodiment of the present application, the second information may further include at least one transmission pool for groupcast transmission, at least one frequency for groupcast transmission, and bandwidth capability of the second UE.

The at least one transmission pool for groupcast transmission may be selected by the second UE based on the at least one transmission pool included in the first information. For example, the second UE may select the at least one transmission pool from its available transmission pools, which overlaps the at least one transmission pool included in the first information. The available transmission pools for the second UE may be configured by a base station, for example, a gNB. In another embodiment of the present disclosure, the available transmission pools for the second UE may be pre-configured in SIM, USIM, or in the second UE. For example, when the second UE is in the coverage of the base station, the available transmission pools of the second UE may be configured by the base station. When the second UE is out of coverage of the base station, the available transmission pools of the second UE may be pre-configured in in SIM, USIM, or in the UEs.

The at least one frequency for groupcast transmission of the second UE includes at least one frequency on which the second UE can do the transmission and reception. The information of the at least one frequency is helpful to coordinate the frequency-time resource for groupcast transmission among the UEs within the group.

The bandwidth capability of the second UE includes the bandwidth in which the second UE can do the transmission and reception. The information of bandwidth capability is helpful to coordinate the frequency-time resource for groupcast transmission among the UEs within the group.

In step 406, the second UE may receive third information for the groupcast connection establishment from the first UE, wherein the third information indicates whether the groupcast connection establishment is successful.

In an embodiment of the present disclosure, in the case that there is no identity collision happened to the second UE, the third information may indicate that the groupcast connection establishment is successful. For example, the third information may be a groupcast connection establishment confirmation message.

In another embodiment of the present disclosure, in the case that there is an identity collision happened to the second UE, the third information may also indicate that the groupcast connection establishment is successful.

In yet another embodiment of the present disclosure, in the case that there is an identity collision happened to the second UE, the third information may indicate that the groupcast connection establishment is not successful. For example, the third information may be a groupcast connection establishment rejection message. According to an embodiment of the present disclosure, after receiving the third information, the second UE may subsequently transmit fourth information indicating a new identity of the second UE different from the previous one, and then the second UE may receive information indicating that the groupcast connection establishment is successful from the first UE. This procedure can start all over again until the establishment is successful. According to another embodiment of the present disclosure, the second UE may directly give up the establishment after receiving the third information indicating the establishment is unsuccessful. According to yet another embodiment of the present disclosure, the second UE may change its identity, and try the establishment several times after receiving the third information indicating the establishment. In the case that all the tries failed, the second UE may give up the establishment.

In yet another embodiment of the present disclosure, in the case that there is an identity collision happened to the second UE, the third information may indicate a new identity of the second UE different from that in the second information. For example, the third information may be a groupcast connection establishment rejection message with the new identity of the second UE assigned by the first UE. In this case, the third information indicates that the groupcast connection establishment is not successful based on the identity in the second information but is successful with the assigned new identity. Upon receiving the third information, the second UE may update its sidelink ID based on the assigned new identity.

Figure 4B:
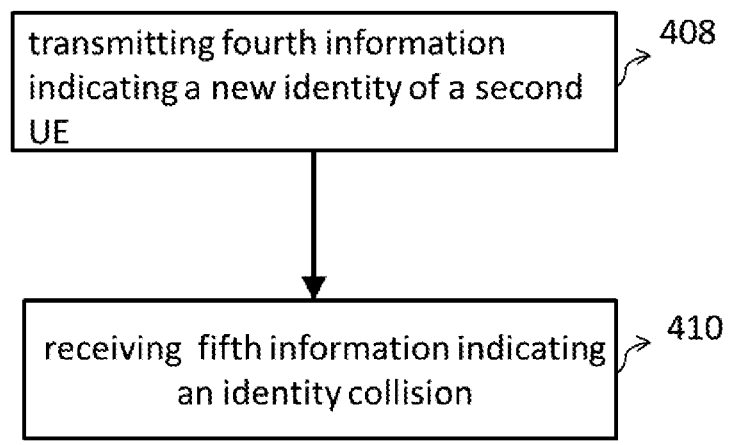
FIG. 4B is a flow chart illustrating a method for solving ID collision during groupcast transmission according to another embodiment of the present disclosure.

FIG. 4B is a flow chart illustrating a method for solving ID collision during groupcast transmission according to another embodiment of the present disclosure, which may be performed by a group member (hereinafter "a second UE" for clarity) UE which has joined to the group through the groupcast connection establishment procedure as shown in FIG. 4A, for example, UE-2 100b. The second UE may be a V2X UE, such as a vehicle. The method illustrated in FIG. 4B may occur after the groupcast connection establishment illustrated in FIG. 4A.

As shown in FIG. 4B, in step 408, the second UE may transmit fourth information indicating an identity of the second UE changed during groupcast transmission to the first UE or a group leader UE. In this embodiment, the second UE may change its identity on the ground that the identity of the second UE collides with the identity of another UE outside the group, and thus the identity of a second UE changed during groupcast transmission is a new identity compared with the identity indicated in the second information during the groupcast connection establishment. The first UE or the group leader UE is a UE which initiates the groupcast connection establishment, for example, a UE-1 100a. Similar to the second UE, the first UE or the group leader UE may be a V2X UE, such as a vehicle.

In step 410, the second UE may receive fifth information indicating that there is an identity collision happened to the second UE in response to the fourth information in the case that there is an identity collision happened to the second UE.

In an embodiment of the present disclosure, after receiving the fifth information, the first UE may subsequently transmit six information indicating a new identity of the second UE different from the identity in the fourth information, and then the second UE may receive a seventh information confirming the new identity in the six information. However, the seventh information confirming the new identity in the six information is not necessary, in the case that the second UE does not receive the seventh information confirming the new in the six information, it may consider that the new identity in the six information is accepted by the first UE.

In yet another embodiment of the present disclosure, the fifth information may indicate a new identity of the second UE assigned by the first UE different from the identity in the fourth information. In this case, after receiving the fifth information, the second UE may update its sidelink ID with the new identity assigned by the first UE.

However, step 410 is not necessary. In the case that there is no identity collision happened to the second UE, the second UE may receive an indication confirming the change of the identity of the second UE in the fourth information. In another embodiment, the second UE may not receive any indication in the case that there is no identity collision happened to the second UE, and the second UE may consider that the identity in the fourth information is accepted by the first UE.

Figure 5:
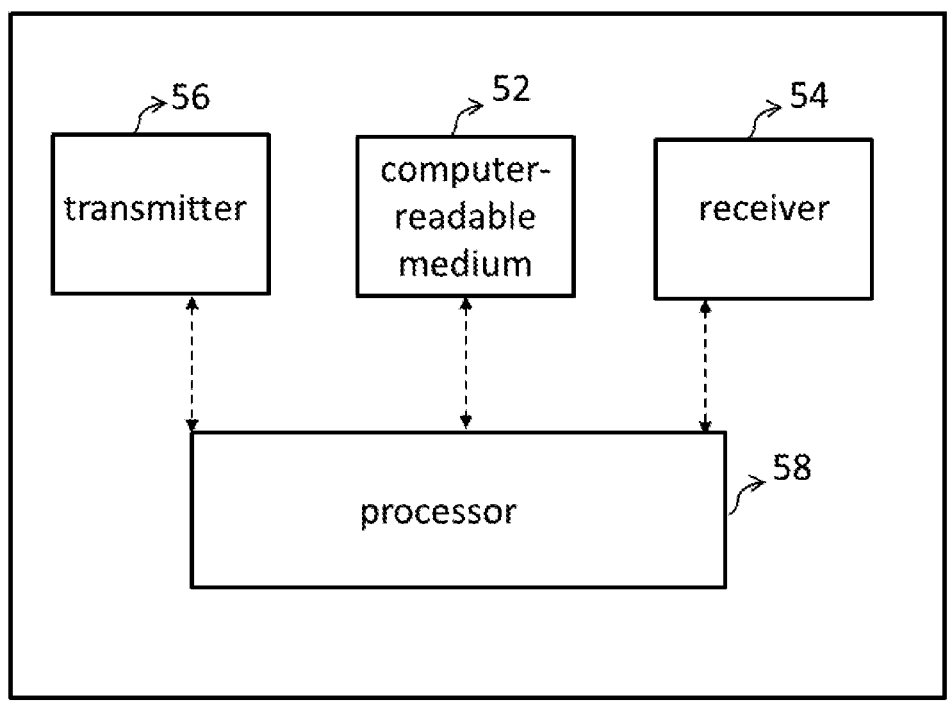
FIG. 5 illustrates a block diagram of an apparatus for groupcast connection establishment between UEs according to an embodiment of the present disclosure.

FIG. 5 illustrates a block diagram of an apparatus 500 for groupcast connect establishment between V2X UEs according to an embodiment of the present disclosure, wherein the apparatus may be a group leader UE, for example the first UE.

Referring to FIG. 5, the apparatus 500 may include at least one non-transitory computer-readable medium 52 having computer executable instructions stored therein, at least one receiver 54, at least one transmitter 56; and at least one processor 58 coupled to the at least one non-transitory computer-readable medium 52, the at least one receiver 54 and the at least one transmitter 56. The computer executable instructions can be programmed to implement a method with the at least one receiver 54, the at least one transmitter 56 and the at least one processor 58, the method according to an embodiment of the present disclosure, for example, the method shown in FIG. 3.

Figure 6:
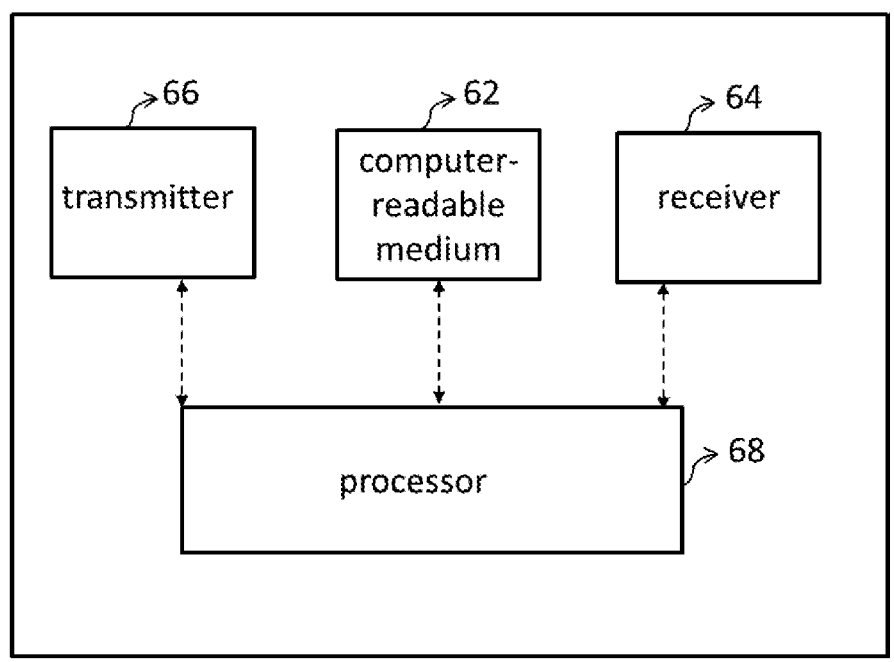
FIG. 6 illustrates a block diagram of an apparatus for groupcast connection establishment between UEs according to another embodiment of the present disclosure.

FIG. 6 illustrates a block diagram of an apparatus 600 for groupcast connect establishment between V2X UEs according to another embodiment of the present disclosure, wherein the apparatus may be a second UE which is interested in the groupcast connection establishment or may be a group member UE which has joined to the group for the groupcast transmission.

Referring to FIG. 6, the apparatus 600 may include at least one non-transitory computer-readable medium 62 having computer executable instructions stored therein, at least one receiver 64, at least one transmitter 66; and at least one processor 68 coupled to the at least one non-transitory computer-readable medium 62, the at least one receiver 64 and the at least one transmitter 66. The computer executable instructions can be programmed to implement a method with the at least one receiver 62, the at least one transmitter 64 and the at least one processor 66, the method according to an embodiment of the present disclosure, for example, the method shown in FIG. 4.

Figure 7:
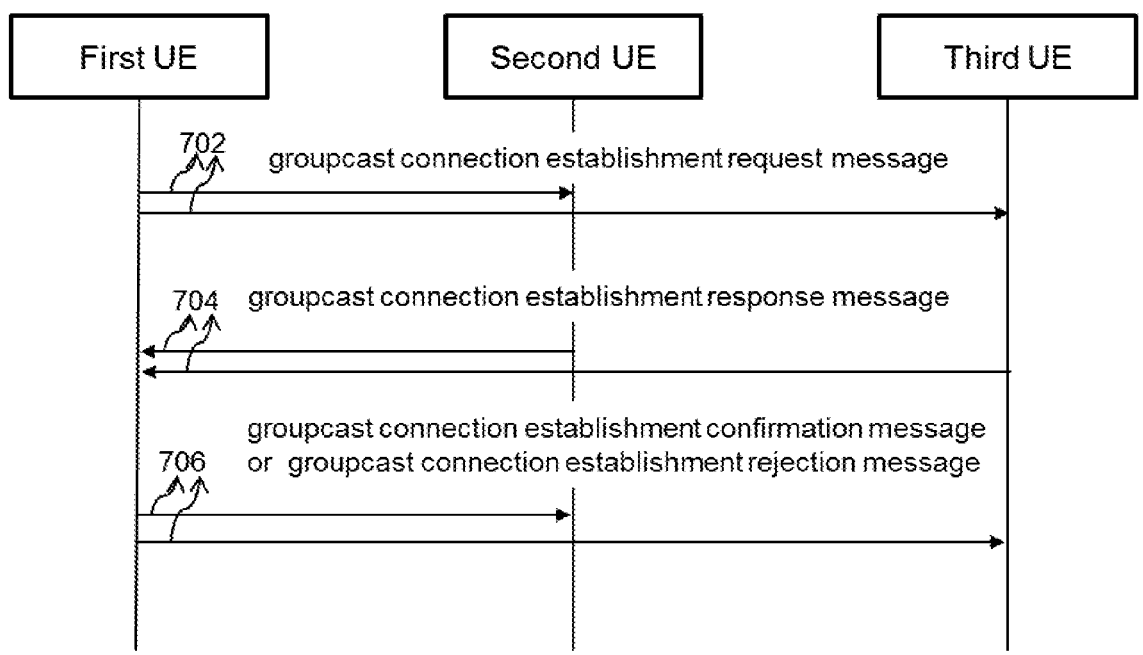
FIG. 7 is a flow chart illustrating a method for groupcast connection establishment between UEs according to yet another embodiment of the present disclosure.

FIG. 7 is a flow chart illustrating a method for groupcast connection establishment between V2X UEs according to yet another embodiment of the present disclosure.

As shown in FIG. 7, in step 702, a first UE may initiate a groupcast connection establishment, and takes a role of a group leader. This step 702 may be triggered by a higher layer than the AS layer to do groupcast transmission on sidelink. The first UE may be a V2X UE, and may be an apparatus shown in FIG. 5. The first UE may transmit first information for groupcast connection establishment to neighbor UEs, in a broadcast manner or a groupcast manner. The first information for the groupcast connection establishment may be a RRC message, such as a groupcast connection establishment request message. The neighbor UEs can receive the first information and may include a second UE, a third UE etc., and may be V2X UEs such as the vehicles.

The groupcast connection establishment request message may include at least one of: group identity information, identity information of the first UE, at least one transmission pool for groupcast transmission, at least one frequency for groupcast transmission, bandwidth capability of the first UE, QoS configuration information, and radio layer related configuration information. Details of the information have been illustrated above.

In step 704, upon receiving the groupcast connection establishment request message, UE(s) receiving the first information, for example, a second UE and third UE may check the group identity information in groupcast connection establishment request message to determine whether to join the group and establish a groupcast connection based on the group identity information. In the case that the UE(s) determines that it wants to join the group and establish a groupcast connection with the first UE, the UE (also called "response UE" for clarity) will make a response to the first information to indicate that it is interested in establishing the groupcast connection with the first UE.

For example, the second UE may be interested in establishing a groupcast connection with the first UE, and thus the second UE may transmit groupcast connection establishment response message to the first UE. The groupcast connection establishment response message may include at least one of: identity information of the response UE, i.e., the second UE, at least one transmission pool for groupcast transmission selected by the response UE, i.e., the second UE, at least one frequency for groupcast transmission of the response UE, i.e., the second UE, and bandwidth capability of the response UE, i.e., the second UE. Details of the information have been illustrated above.

Similar to the second UE, the third UE may also be interested in establishing a groupcast connection with the first UE, and thus the third UE may also transmit a groupcast connection establishment response message to the first UE. The groupcast connection establishment response message may at least one of: identity information of the response UE, i.e., the third UE, at least one transmission pool for groupcast transmission selected by the response UE, i.e., the third UE, at least one frequency for groupcast transmission of the response UE, i.e., the third UE, and bandwidth capability of the response UE, i.e., the third UE. Details of the information have been illustrated above.

Upon receiving the groupcast connection establishment response messages from the second UE and third UE, the first UE may determine whether an identity collision happened to the second UE and the third UE based on the identity information included in the groupcast connection establishment response messages. For example, the first UE may determine whether the identities of at least two of the second UE, the third UE and other response UEs are the same so as to determine whether the identity collision happened to the second UE and the third UE. For the identity collision issues, the first UE, i.e., the group leader may take different solutions. Then, in step 706, the first UE may transmit further information to the response UEs to indicate whether the groupcast connection establishment is successful. The further information from the first UE may be a groupcast connection establishment confirmation message or a groupcast connection establishment rejection message.

In an embodiment of the present disclosure, the first UE may determine that the identity of the third UE is different other response UEs including the second UE, while the identity of the second UE is the same as the identity of another response UE. Accordingly, the first UE may determine that the identity collision happened to the second UE.

In an embodiment of the present disclosure, the first UE may transmit a groupcast connection establishment confirmation message to the third UE to indicate that the groupcast connection establishment is successful, while transmit a groupcast connection establishment rejection message to the second UE to indicate that the groupcast connection establishment is not successful due to identity collision. In another embodiment of the present disclosure, the first UE may change the identity of the second UE into a new one, which does not collide with other UEs. Then, the first UE will also transmit a groupcast connection establishment confirmation message to the second UE to indicate that the groupcast connection establishment is successful. In yet another embodiment of the present disclosure, the first UE may allow the second UE to use the current identity, while changes the identity of other UE(s) involving the identity collision or transmits a groupcast connection establishment rejection message to other UE(s) involving the identity collision. The same processing can also be applicable to the third UE.

In an embodiment of the present disclosure, for the response UE receiving the groupcast connection establishment rejection message, they may directly give up the establishment. According to another embodiment of the present disclosure, they may change their identities, and try the establishment several times. In the case that all the tries failed, they may give up the establishment.

Figure 8:
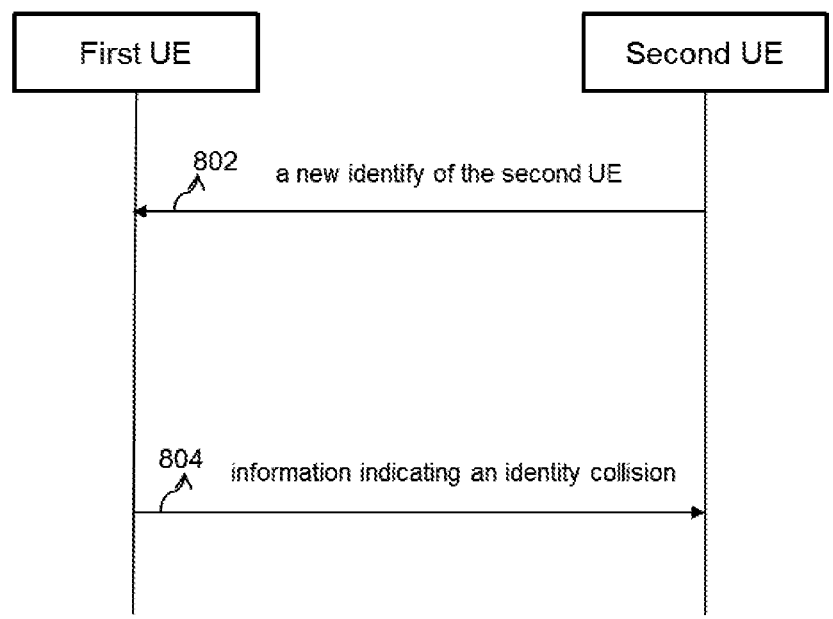
FIG. 8 is a flow chart illustrating a method for solving ID collision during groupcast transmission between UEs according to yet another embodiment of the present disclosure.

FIG. 8 is a flow chart illustrating a method for solving ID collision during groupcast transmission according to yet another embodiment of the present disclosure.

During the groupcast transmission, the identity of a group member UE (not including the group leader) may change for factors unknown by the group leader UE. For, example, the group member UE, for example a second UE may change its identity on the ground that its identity collides with the identity of another UE outside the group. The group member UE may report the change to the group leaser UE to maintain the groupcast transmission. As shown in FIG. 8, in step 802, a group member UE, for example a second UE may transmit first information indicating the changed identity of the second UE to the group leader UE (hereinafter "a first UE" for clarity). The group leader UE may be an apparatus shown in FIG. 5. The group member UE may be an apparatus shown in FIG. 6.

Upon receiving the first information from the second UE, the group leader UE may determine whether an identity collision happened to the group member UE. In the case that the identity of the second UE is the same as at least one of other group member UEs, the group leader UE may determine that the identity collision happens to the second UE.

In step 804, the group leaser UE may transmit second information indicating that there is an identity collision happened to the second UE in response to the first information in the case that there is an identity collision happened to the second UE.

In an embodiment of the present disclosure, after receiving the second information, the second UE may change a new identity and transmit third information indicating the new identity different from the previous identity to the group leader UE. Similarly, the group leader UE may check whether an identity collision happens based on the new identity. In another embodiment of the present disclosure, even in the case that an identity collision happens, the group leader UE may directly change the identity of the second UE into a new one and indicates the new identity to the second UE.

However, step 804 is not necessary. In the case that there is no identity collision happened to the second UE, the group leader UE may transmit an indication confirming the change of the identity of the second UE in the first information. In another embodiment of the present disclosure, the group leader UE may not transmit any indication in the case that there is no identity collision happened to the second UE.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A method performed by a first user equipment (UE), the method comprising:

transmitting first information for a groupcast connection establishment to a plurality of UEs;

receiving second information for the groupcast connection establishment from a second UE of the plurality of UEs, wherein the second information comprises identity information of the second UE; and transmitting third information for the groupcast connection establishment to the second UE, wherein the third information indicates whether the groupcast connection establishment is successful.

2. The method of claim 1, wherein the first information comprises at least one of:

group identity information;

identity information of the first UE;

at least one transmission pool for groupcast transmission;

at least one frequency for groupcast transmission;

bandwidth capability of the first UE;

quality of service configuration information; and radio layer related configuration information.

3. The method of claim 2, wherein each of the identity information of the first UE and the identity information of the second UE is represented in one of:

proximity-based services UE identity;

source layer-2 identity;

destination layer-2 identity;

session identity; and connection identity.

4. The method of claim 2, wherein the quality of service configuration information comprises at least one of:

5QI indication;

delay requirement indication;

reliability requirement indication;

radio bear configuration; and quality of service flow to radio bearer mapping indication.

5. The method of claim 2, wherein the radio layer related configuration information comprises at least one of:

media access control configuration information, wherein the media access control configuration information includes configuration information for a number of hybrid automatic repeat request retransmission ;

radio link control configuration information, wherein the radio link control configuration information includes configuration information for radio link control acknowledged mode or unacknowledged mode;

packet data convergence protocol configuration information, wherein the packet data convergence protocol configuration information includes configuration information for packet data convergence protocol duplication; and physical layer configuration information, wherein the physical layer configuration information includes at least one of hybrid automatic repeat request configuration information and channel state information configuration information.

6. The method of claim 1, wherein the second information further comprises at least one of:

at least one transmission pool for groupcast transmission;

at least one frequency for groupcast transmission; and bandwidth capability of the second UE.

7. The method of claim 1, wherein the third information indicates that the groupcast connection establishment is successful if there is no identity collision happened to the second UE.

8. The method of claim 1, wherein the third information indicates that the groupcast connection establishment is not successful if there is an identity collision happened to the second UE.

9. The method of claim 1, wherein the third information is information indicating a new identity of the second UE if there is an identity collision happened to the second UE.

10. The method of claim 8, comprising receiving, at the first UE, fourth information indicating a new identity of the second UE in response to the third information.

11. A method performed by a second user equipment (UE), the method comprising:
   receiving first information for a groupcast connection establishment from a first UE;
   transmitting second information for the groupcast connection establishment, wherein the second information comprises identity information of the second UE;
   receiving third information for the groupcast connection establishment from the first UE, wherein the third information indicates whether the groupcast connection establishment is successful.

12. The method of claim 11, wherein the first information comprises at least one of:
   group identity information;
   identity information of the first UE;
   at least one transmission pool for groupcast transmission;
   at least one frequency for groupcast transmission;
   bandwidth capability of the first UE;
   quality of service configuration information; and
   radio layer related configuration information.

13. The method of claim 12, wherein each of the identity information of the first UE and the identity information of the second UE is represented in one of:
   proximity-based services UE identity;
   source layer-2 identity;
   destination layer-2 identity;
   session identity; and
   connection identity.

14. The method of claim 12, wherein the quality of service configuration information comprises at least one of:
   5QI indication;
   delay requirement indication;
   reliability requirement indication;
   radio bear configuration; and
   quality of service flow to radio bearer mapping indication.

15. The method of claim 12, wherein the radio layer related configuration information comprises at least one of:
   media access control configuration information, wherein the media access control configuration information includes configuration information for a number of hybrid automatic repeat request retransmission;
   radio link control configuration information, wherein the radio link control configuration information includes configuration information for radio link control acknowledged mode or unacknowledged mode;
   packet data convergence protocol configuration information, wherein the packet data convergence protocol configuration information includes configuration information for packet data convergence protocol duplication; and
   physical layer configuration information, wherein the physical layer configuration information includes at least one of hybrid automatic repeat request configuration information and channel state information configuration information.

16. The method of claim 11, wherein the second information further comprises at least one of:
   at least one transmission pool for groupcast transmission;
   at least one frequency for groupcast transmission; and
   bandwidth capability of the second UE.

17. The method of claim 11, wherein the third information indicates that the groupcast connection establishment is successful if there is no identity collision happened to the second UE.

18. The method of claim 11, wherein the third information indicates that the groupcast connection establishment is not successful if there is an identity collision happened to the second UE.

19. A first user equipment (UE), comprising:
   at least one memory; and
   at least one processor coupled with the at least one memory and configured to cause the first UE to:
      transmit first information for a groupcast connection establishment to a plurality of UEs;
      receive second information for the groupcast connection establishment from a second UE of the plurality of UEs, wherein the second information comprises identity information of the second UE; and
      transmit third information for the groupcast connection establishment to the second UE, wherein the third information indicates whether the groupcast connection establishment is successful.

20. A second user equipment (UE), comprising:
   at least one memory; and
   at least one processor coupled with the at least one memory and configured to cause the second UE to:
      receive first information for a groupcast connection establishment from a first UE;
      transmit second information for the groupcast connection establishment, wherein the second information comprises identity information of the second UE;
      receive third information for the groupcast connection establishment from the first UE, wherein the third information indicates whether the groupcast connection establishment is successful.

* * * * *